US008868769B2

(12) United States Patent
Prywes

(10) Patent No.: US 8,868,769 B2
(45) Date of Patent: Oct. 21, 2014

(54) SYSTEM AND METHOD FOR OBTAINING RESPONSES TO TASKS

(76) Inventor: Noah Prywes, Bala Cynwyd, PA (US)

( * ) Notice: Subject to any disclaimer, the term of this patent is extended or adjusted under 35 U.S.C. 154(b) by 1672 days.

(21) Appl. No.: 11/669,435

(22) Filed: Jan. 31, 2007

(65) Prior Publication Data

US 2007/0280439 A1 Dec. 6, 2007

Related U.S. Application Data

(62) Division of application No. 09/666,509, filed on Sep. 20, 2000, now abandoned.

(60) Provisional application No. 60/189,089, filed on Mar. 14, 2000.

(51) Int. Cl.
*G06F 15/16* (2006.01)
*H04M 11/10* (2006.01)
*H04L 29/06* (2006.01)
*G10L 13/00* (2006.01)
*G10L 15/26* (2006.01)

(52) U.S. Cl.
CPC ............... *H04M 11/10* (2013.01); *H04L 69/08* (2013.01); *H04L 69/169* (2013.01); *G10L 13/00* (2013.01); *G10L 15/26* (2013.01)
USPC ......................................................... 709/230

(58) Field of Classification Search
CPC ..................... H04M 2201/60; H04M 3/42382; G10L 15/26; H04L 69/08; H04L 69/169; G06L 15/26; G06L 13/00
USPC .................................. 709/201, 203, 206, 230
See application file for complete search history.

(56) References Cited

U.S. PATENT DOCUMENTS

| 5,774,857 | A  | * | 6/1998  | Newlin ........................... 704/271 |
| 5,951,638 | A  | * | 9/1999  | Hoss et al. ..................... 709/206 |
| 6,035,273 | A  | * | 3/2000  | Spies ............................. 704/270 |
| 6,182,059 | B1 | * | 1/2001  | Angotti et al. .................. 706/45 |
| 6,353,809 | B2 | * | 3/2002  | Takahashi et al. ............. 704/235 |
| 6,363,065 | B1 | * | 3/2002  | Thornton et al. ............. 370/352 |
| 6,377,925 | B1 | * | 4/2002  | Greene et al. ................ 704/271 |
| 6,411,947 | B1 | * | 6/2002  | Rice et al. ....................... 706/47 |
| 6,693,893 | B1 | * | 2/2004  | Ehlinger ....................... 370/352 |
| 6,870,914 | B1 | * | 3/2005  | Bossemeyer et al. ..... 379/142.06 |
| 6,947,156 | B1 | * | 9/2005  | Jeyachandran et al. ...... 358/1.15 |
| 7,130,807 | B1 | * | 10/2006 | Mikurak .......................... 705/7 |

* cited by examiner

*Primary Examiner* — Kristie Shingles
(74) *Attorney, Agent, or Firm* — Ked & Associates LLP

(57) ABSTRACT

A method of automatically forwarding a response to a message to the sender of the message, wherein the sender is prompted to provide a message, the sender is prompted to identify a recipient, the recipient having a plurality of associated contact numbers, a user is prompted to rank the identified associated contact numbers relating to the recipient from highest to lowest, the message is sent to the highest ranked associated contact number to which the message has not yet been sent, the recipient of the message is prompted to provide a reply to the message, at least a predetermined amount of time is waited, until a response is received or the message has been sent to all associated contact numbers, the message is repeatedly sent to the next highest ranked associated contact number (and the recipient is prompted and the predetermined amount of time is waited), and the response is forwarded to the sender.

28 Claims, 9 Drawing Sheets

Figure 6A

| Response Result Table | Total # of Contact | | 2 | Yes/Accept | 2 |
|---|---|---|---|---|---|
| Not Reached | 0 | Total # of Responses | 2 | No/reject | 0 |

Task Contact Report

| # | Name (2) | Number/Email (3) | M (4) | W (5) | A (6) | D | T | S (8) | R (9) | D | T | Last (10) | Min (11) |
|---|---|---|---|---|---|---|---|---|---|---|---|---|---|
| 1 | marten | 215-802-3207 | P | A | 3 | 002 | 0 | 8 | 0 | 3 | 14:06 | 8 |
| | \$75,000 for the week | | | | | | | | | | | | |
| 2 | alan | 215382899 | P | A | 3 | 003 | 0 | 8 | 0 | 2 | 18:03 | 10 |
| | \$25,000 for the week | | | | | | | | | | | | |

1. # - Contact number
2. Name - To use in contacting, including title (if any), up to 20 characters
3. Number / email
   a – Telephone: up to 20 characters – Country code, area code, number, extension (country code and extension are optional).
   b – Email: up to 40 characters
4. M-Mode. P-Phone, E-email, F-fax, G-paging
5. Default telephone for number, email for email address
   W - Hours for contact
   W – Working hours 9:00 to 17:00
   E – Evening hours 18:00 to 23:00
   A – Default anytime, as soon as possible.
6. End Time to discontinue pursuing contact and start alternate contact (in Alt. row).
   D - day T - Time, Default 72 hours
7. Alt – Alternative contact number. Default no alternative contact.

8. S - Status
   1 – contact being initiated
   2 – busy line – retry in 15 minutes
   3 – no answer – retry in 60 minutes
   4 – illegal telephone / address; contact terminated
   5 – left message to call / mail back
   6 – contactee provided alternative number to contact
   7 – no response / hung up
   8 – response obtained
   Only contacts with status 1-4 can be updated.
9. R – Response
   1 - Yes or accept
   2 - No or decline
   3 - No opinion
   4 - Message refused
   5 - Sender not to contact again
   6 - Blank / no response
10. Last – D – day T – time of last try/contact
11. Min – Minutes
    Cumulative minutes per telephone contact, charged at 10¢ / minute.

Figure 6B

SYSTEM AND METHOD FOR OBTAINING RESPONSES TO TASKS

CROSS-REFERENCE TO RELATED APPLICATIONS

This is a division of co-pending application No. 09/666,509, filed Sep. 20, 2000, incorporated herein by reference, which claims the benefit of U.S. Provisional Application No. 60/189,089, filed Mar. 14, 2000.

The present invention relates generally to messages and more particularly to responses to messages.

Individuals frequently desire to obtain short answers to simple questions, yet spend an inordinate amount of time obtaining such answers. For example, an individual may desire to determine whether one or more other people are available for a meeting at a specified time and place or whether one or more people are in favor of a previously distributed proposal. Placing one or more telephone calls to the other person or persons manually involves, with respect to each person to be called, retrieving the telephone number, dialing the telephone number, exchanging pleasantries, possibly discussing items on the other party's agenda, stating the question or message (and possibly restating it if the other party does not Immediately understand it or is inattentive), and receiving an answer (or being told that the other party will call back later with an answer). If the other party does not take the telephone call, the individual may need to repeat the call at a later time if the other party fails to respond to a message or has no means of taking a message at that number. The end result is the expenditure of a great deal of time and effort to communicate a brief message and receive a simple response. Moreover, if multiple parties must be contacted, the effort must be duplicated with respect to each such party.

E-mail provides some time savings if each party to be contacted has a known e-mail address in that extraneous discussions may be minimized or ignored. However, e-mail messages are easier to ignore than telephone calls (if actually answered) and may result in the need to send a substantial number of follow-up messages to obtain the needed information. Moreover, some individuals do not regularly check their e-mail accounts for messages. A method of automatically sending messages and obtaining responses (and sending follow-up messages if no reply is received) is therefore desirable.

A second problem with manual placement of telephone calls (or other messages) is that many individuals possess a number of contact numbers, such as home, office, and mobile telephone numbers, pager numbers, home and office facsimile numbers, and home and office e-mail addresses. Sending a message to each contact number of an individual (until the individual answers) can be a time consuming process. A method of automatically retransmitting a message to each such contact number until a response is received would therefore be desirable.

A third problem is that an individual who needs to send a single message to (and receive a reply from) a group of individuals using more than one channel of communication (such as telephone, facsimile, and e-mail) must repeatedly provide the message in oral or written form and must manually tabulate the replies of the message recipients. A method of automatically sending a single message to a group of people utilizing more than one channel of communication without the need for repetitive entry of the message is therefore desirable.

Similarly, receiving telephone calls from multiple callers regarding a single subject, such as telephone calls from the users of a new product regarding their assessments of the new product, can involve considerable time and effort. The party receiving the calls needs to indentify the caller and the subject of the call as well as to receive the caller's comments. The caller may not have all of the required information available at the time of an initial telephone call requiring a subsequent telephone call to provide all of the information, or may provide extraneous comments, thereby extending the length of the call. A method of automatically receiving such telephone calls and compiling the data received would therefore be desirable.

SUMMARY OF THE INVENTION

In one embodiment, the invention relates to a method of automatically forwarding a response to a message to the sender of the message, wherein the sender is prompted to provide a message, the sender is prompted to identify a recipient, the recipient having a plurality of associated contact numbers, a user is prompted to rank the identified associated contact numbers relating to the recipient from highest to lowest, the message is sent to the highest ranked associated contact number to which the message has not yet been sent, the recipient of the message is prompted to provide a reply to the message, at least a predetermined amount of time is waited, until a response is received or the message has been sent to all associated contact numbers, the message is repeatedly sent to the next highest ranked associated contact number (and the recipient is prompted and the predetermined amount of time is waited), and the response is forwarded to the sender.

In another embodiment, the call time of the sender is less than the call time of the recipient. In yet another embodiment, the call time of the sender is less than the call time of the sender would have been had the sender communicated with the recipient by multi-party telephone call. In certain embodiments, the channel of communication utilized by the recipient for sending the response is the same as the channel of communication utilized by the sender for sending the message, while in other embodiments, the channel of communication utilized by the recipient for sending the response is different from the channel of communication utilized by the sender for sending the message. In various embodiments, the channel of communication utilized by the sender for sending the message is e-mail, paging, automated telephone call, facsimile, postal mail, other forms of communication, or any combination of such forms of communication.

In another embodiment, the method further includes prompting the recipient to reply to the telephone call at a later time if the automated telephone call is connected but no response to the message is received.

In another embodiment, the method further includes repeating the method with respect to additional recipients of the same message.

In various embodiments, each response is forwarded separately to the sender, the responses from different recipients are forwarded separately, or responses from several recipients are forwarded together. In certain embodiments, responses forwarded together are forwarded as a composite report. In one embodiment, the composite report comprises a listing of each successful message transmission. In another embodiment, the composite report instead or in addition comprises a listing of each response. In another embodiment, the composite report instead or in addition comprises summary data relating to all of the responses.

In another embodiment, the method further includes prompting the current recipient to indicate whether to send the current recipient's response to the other recipients of the sender's message, and sending the current recipient's response to the other recipients of the sender's message if the current recipient indicates that the response should be sent to the other recipients.

In another embodiment, the user prompted to rank the plurality of associated contact numbers is the sender. In another embodiment, the user prompted to rank the plurality of associated contact numbers is the recipient. In another embodiment, the user prompted to rank the plurality of associated contact numbers is neither the sender nor the recipient.

In another embodiment, if the user fails to provide a ranking of associated contact numbers, a default ranking is used.

In another embodiment, the method further includes prompting a user to rank the associated contact numbers relating to the identified recipient from highest to lowest in a second ordering and to supply a condition, wherein, if the user does so provide a second ranking, the ordering utilized is selected based on the condition. In another embodiment, the condition comprises a criterion relating to the time of day at which the message is being sent. In another embodiment, the condition comprises a criterion relating to the day of the week on which the message is being sent. In another embodiment, the condition comprises a criterion relating to the identity of the sender. In another embodiment, the condition comprises a criterion relating to the content of the message.

In another embodiment, the method further includes prompting a user to provide an expiration time for at least one associated contact number, wherein if the expiration time of an associated contact number has passed prior to the sending of a message using the associated contact number, such associated contact number is not utilized.

In another embodiment, the method further includes prompting a user to provide a commencement time for at least one associated contact number, wherein if the sending of a message occurs prior to the commencement time of an associated contact number, the associated contact number is not utilized.

In another embodiment, the method further includes prompting a user to provide a start time, wherein, if a user provides a start time the sending of the message is delayed until the start time.

In another embodiment, the predetermined amount of time is equal to zero seconds. In another embodiment, the predetermined amount of time exceeds zero seconds. In another embodiment, the predetermined amount of time depends on the channel of communication used for sending the message. In another embodiment, the method further includes prompting a user to provide an amount of time, wherein, if the user provides an amount of time, the predetermined amount of time is equal to the amount of time provided by the user.

In another embodiment, the method further includes converting a verbal message provided by the sender into textual form.

In another embodiment, the message is sent to at least one recipient by e-mail.

In another embodiment, the method further includes converting a verbal response provided by the recipient into textual form.

In another embodiment, the sender is prompted to provide a message over the Web, such prompting includes prompting the sender to provide a message subject, a message body, one or more prompts to be provided to the recipient, a type of data to be collected, and a message to be provided if the message is sent by telephone call and the telephone call is answered by a voicemail system, the response of the recipient to the message is received using automatic speech recognition if the message is sent to a telephone number, a searchable address book is provided to the sender, and the sending of the message includes, in the case of a message being sent to an associated contact number that includes a telephone extension, automatically dialing both the telephone number and the telephone extension.

In another embodiment, the response is sent to the sender by e-mail.

In another embodiment, if the transmission of a message using an associated contact number is not successful, the message is retransmitted to the same associated contact number until the message is successfully transmitted to the associated contact number or until a predetermined number of transmissions have been unsuccessful.

In another embodiment, the method further includes prompting the recipient to indicate the recipient's response is urgent, wherein, if the recipient indicates that the response is urgent, the response is sent to the sender within a predetermined amount of time.

In another embodiment, the method further includes prompting a user to contact an operator, wherein the operator has access to data relating to the sender's message.

In another embodiment, the message provided by the sender comprises a plurality of questions, and the recipient is prompted to provide an answer to each question in the sender's message.

In another embodiment, a method of automatically forwarding a response to a message to the sender of the message, wherein a message and a ranked set of associated contact numbers are received from the sender, the message is sent to the recipient at the highest ranked associated contact number to which the message can be successfully sent, a reply to the message is received from the recipient, and the response is forwarded to the sender.

In another embodiment, a system for automatically forwarding a response to a message to the sender of the message, including means for prompting the sender to provide a message, means for prompting the sender to identify a recipient, the recipient having a plurality of associated contact numbers, means for prompting a user to rank the associated contact numbers relating to the recipient identified by the sender from highest to lowest, means for sending the message provided by the sender to the highest ranked associated contact number to which the message has not yet been sent, means for prompting the recipient of the message to provide a reply to the message, means for waiting at least a predetermined amount of time, means for repeatedly sending the message provided by the sender to the highest ranked associated contact number to which the message has not yet been sent, prompting the recipient of the message to provide a reply to the message and waiting at least a predetermined amount of time until a response is received or the message has been sent to all associated contact numbers; if no response to the message is received, and means for forwarding the response to the sender.

In another embodiment, a computer-readable medium having stored thereon computer-executable instructions for prompting the sender to provide a message, prompting the sender to identify a recipient, the recipient having a plurality of associated contact numbers, prompting a user to rank the associated contact numbers relating to the recipient from highest to lowest, sending the provided message to the highest ranked associated contact number to which the message has not yet been sent, prompting the recipient of the message to provide a reply to the message, waiting at least a predetermined amount of time, repeatedly sending the message to the next highest ranked associated contact number until a response is received or the message has been sent to all associated contact numbers (and prompting the recipient to provide a response and waiting a predetermined amount of time) if no response to the message has been received, and forwarding the response to the sender.

In another embodiment, a system for automatically forwarding a response to a message to the sender of the message, including a processor, a memory connected to the processor, at least one communication interface in communication with the processor, a display in communication with the processor, and an input device in communication with the processor, wherein the processor causes the sender to be prompted to provide a message, the processor causes the sender to be prompted to identify a recipient, the recipient having a plurality of associated contact numbers, the processor causes a user to be prompted to rank the associated contact numbers relating to the identified recipient from highest to lowest, the processor causes the message to be sent to the highest ranked associated contact number to which the message has not yet been sent, the processor causes the recipient of the message to be prompted to provide a reply to the message, the processor waits at least a predetermined amount of time, the processor repeatedly causes the message provided by the sender to be sent to the highest ranked associated contact number to which the message has not yet been sent, the processor causes the recipient of the message to be prompted to provide a reply to the message, and the processor waits at least a predetermined amount of time until a response is received or the message has been sent to all associated contact numbers; if no response to the message is received, and the processor causes the response to be forwarded to the sender.

In various embodiments, the communication interface comprises an Internet connection, a facsimile device, a telephone connection, or voice recognition code.

In various embodiments, the input device comprises a keypad, a microphone, a keyboard, or a pointing device.

In another embodiment, the system further includes at least one database stored in the memory. In another embodiment, the at least one database comprises at least one table for storing associated contact numbers, at least one table for storing unsent messages, and at least one table for storing data relating to expected responses to messages.

In another embodiment, a method of processing messages, wherein each of a plurality of users is prompted to send a message using one of a plurality of interfaces, including at least a telephone interface and an e-mail interface, a recipient is prompted to select an interface by which messages are to be forwarded to the recipient from a plurality of interfaces, including at least a telephone interface and an e-mail interface, and each message sent by the plurality of users is forwarded to the recipient utilizing the selected interface.

In another embodiment, a method of processing inbound and outbound messages, wherein an inbound recipient is prompted to provide at least one associated contact number, a sender is prompted to provide a message, the sender is prompted to identify a recipient, the recipient having at least one associated contact number, and the message is sent to at least one associated contact number, wherein, if the message is an outbound message, the sender is prompted to provide the message over the Web and wherein, if the message is an inbound message, the recipient is prompted to provide at least one associated contact number. In one embodiment, the identified recipient is the inbound recipient. In another embodiment, the recipient is an outbound recipient.

In another embodiment, a method of processing inbound messages, wherein a sender is prompted to provide a message in voice form, the sender is prompted to identify a recipient, the recipient having at least one associated contact number, the message provided by the sender is converted to text form, and the message is sent to at least one associated contact number.

In another embodiment, a method of processing outbound messages, wherein a sender is prompted to provide a message in voice form, the sender is prompted to identify a recipient, the recipient having at least one associated contact number, the message provided by the sender is converted to text form, and the message is sent to at least one associated contact number.

In another embodiment, a method of automatically forwarding a response to a message to the sender of the message, wherein a sender is prompted to provide a message, the sender is prompted to identify a recipient, a telephone call is placed to the recipient, the message and a set of prompts are provided to the recipient if the recipient answers the telephone call, a message, including a telephone number to call back if the telephone call is answered by a voicemail system, is automatically recorded, and the message and a set of prompts are provided to the recipient if the recipient places a telephone call to the provided telephone number.

In another embodiment, a method of processing outbound messages, wherein a sender is prompted to provide a message, the sender is prompted to identify a recipient, the recipient having at least one associated contact number, the sender is prompted to customize at least one of the time at which the message will be sent, the text of at least one prompt, the number of prompts in the set of prompts to be provided to the recipient, the number of iterations of the set of prompts, and the type of data to be received in response to at least one prompt, the message is sent to at least one associated contact number, and at least one prompt is provided to the recipient.

In another embodiment, the method further includes validating data received in response to a prompt provided based at least in part on a received data type relating to the prompt.

In another embodiment, a method of processing inbound messages, wherein a sender is prompted to provide a message, the sender is prompted to identify a recipient, the recipient having at least one associated contact number, the recipient is prompted to customize at least one of the text of at least one prompt, the number of prompts in the set of prompts to be provided to the sender, the number of iterations of the set of prompts, and the type of data to be received in response to at least one prompt, at least one prompt is provided to the sender, and the message is sent to at least one associated contact number.

In another embodiment, the method further includes validating data received in response to a prompt based at least in part on a data type relating to the received prompt.

In yet another embodiment, the invention relates to a method and system for performing a task via a computer network. Means are provided for receiving a request to perform a task from a task assigner via at least one first communication medium; converting the request from the at least one first communication medium to digital text; using the text to determine the task; requesting additional information if required to complete the task; performing the task via a host and data in a computer network; and responding to a recipient with information from the completed task via at least one second communication medium. In various forms of this invention, the request includes contact information for network hosts, databases, and recipients. The first and second communication mediums may be different or the same. The communication mediums may be speech communication via a public service telephone system or an IP network. The communication mediums may be via a landline phone, a mobile phone, email, a fax, a pager, or a database.

The contact information may be used to determine the task and wherein the contact information is obtained from at least one of the network hosts, databases, and recipients. The step for determining the task may include querying a database and/or a remote host. The task can be changed during the execution of the task.

The conversion step may include translating speech to text. The invention may also include the step of converting the information from the completed task into the second communication medium which may also include translating text to speech.

In one preferred version of the invention, the task assigner and the recipient includes a plurality of concurrent task assigners and recipients. The task assigner may even be the recipient.

BRIEF DESCRIPTION OF THE DRAWINGS

FIG. 6A illustrates a user interface screen of a Web site usable in conjunction with the present invention.

FIG. 6B illustrates a user interface screen of a Web site usable in conjunction with the present invention.

DETAILED DESCRIPTION OF THE INVENTION

Figure 1:
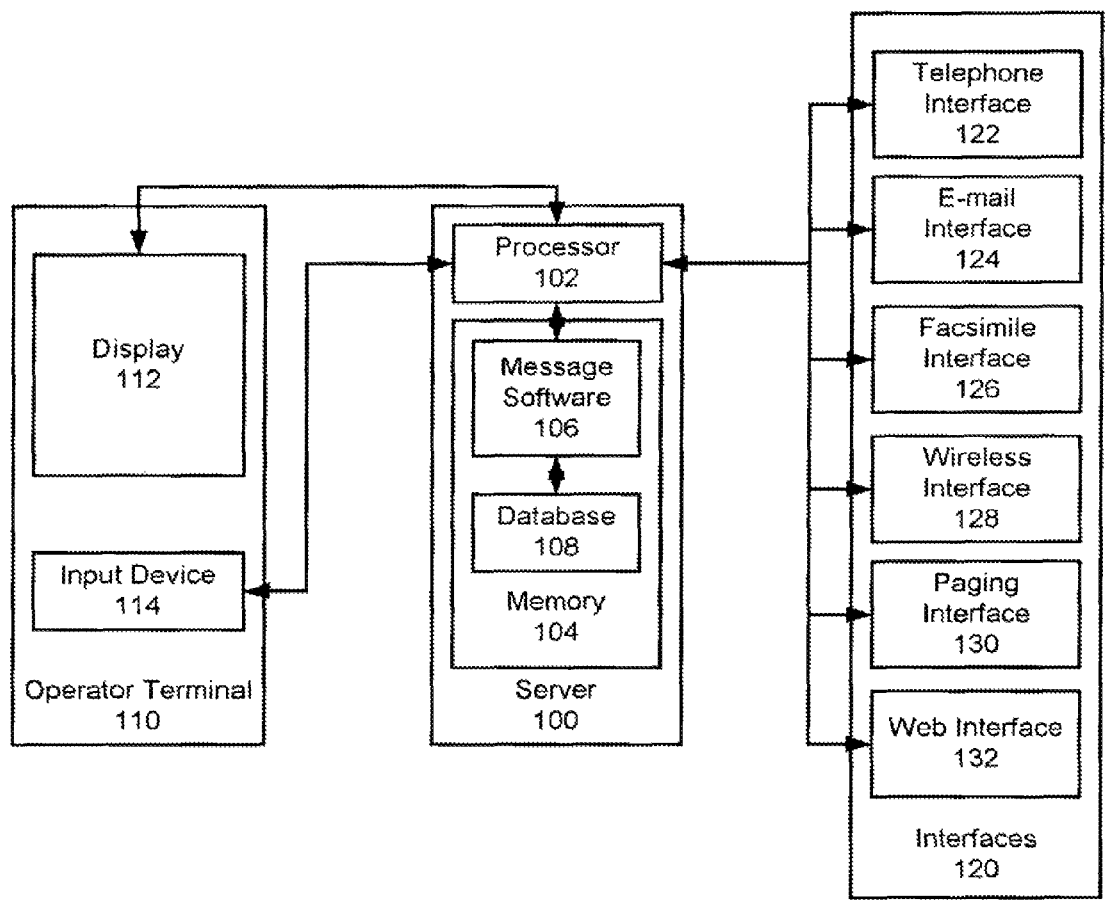
FIG. 1 is a block diagram illustrating a system in accordance with the present invention.

The following terms shall have, for the purposes of this application, the respective meanings set forth below:

Associated Contact Number: An identifier relating to a particular message recipient used to address a message to that recipient, such as a telephone, pager, or facsimile number or an e-mail address. In a preferred embodiment, the associated contact number includes both the identifier itself (such as a telephone number or an e-mail address) and a designation of the type of the identifier (such as telephone number or e-mail).

Call Time: With respect to a message sender, the call time is the amount of time spent by the sender in speaking, typing, or otherwise entering a message and in reading, listening to, or otherwise reviewing a response thereto (if any). With respect to a message recipient, the call time is the amount of time spent by the recipient in reading, listening to, or otherwise reviewing the message and in speaking, typing, or otherwise entering a response thereto (if any response is entered).

Channel of Communication: A medium for sending a message or a response thereto in analog, digital or other form, such as e-mail, page, live telephone call, automated telephone call (using a recorded or computer-generated voice message), or facsimile.

Communication Interface: Hardware, software, or a combination of hardware and software enabling a processor to receive and send messages using one or more channels of communication.

Current Recipient: In connection with the method illustrated in FIG. 4, the recipient to whom a message is currently being sent.

Inbound Message: A message sent from one of a plurality of senders to a single recipient.

Inbound Recipient: Any person who receives an inbound message.

Inbound Sender: Any person who sends an inbound message.

Message: An oral, written recorded, or other communication uttered, sent, or otherwise transmitted from one person to one or more other persons. The term message includes, without limitation, a live, recorded, or computer-generated voice message as well as written or otherwise recorded textual or graphical content, and can optionally be encrypted or otherwise protected. Specific examples of a message, within the context of the present application, include, without limitation, a statement or question uttered in a multi-party telephone call, a statement or question entered using instant messaging, a groupware or meeting support tool, or in a chat room, a recorded or computer-generated voice message, textual or graphical content delivered by e-mail or by pager, textual or graphical content delivered by facsimile, or textual or graphical content in hard copy form (such as paper) delivered by postal mail, hand delivery, or otherwise.

Multi-Party Telephone Call: An ordinary (live) telephone call having at least two parties.

Outbound Message: A message sent from a single sender to one or more recipients.

Outbound Recipient: Any person who receives an outbound message.

Outbound Sender: Any person who sends an outbound message.

Recipient: Any person who receives a message, whether the message is inbound or outbound.

Sender: Any person who sends a message, whether the message is inbound or outbound.

Unsuccessful: A message is considered to be unsuccessful if it is not delivered. The success of a message does not depend on whether the recipient responds to the message or even whether the recipient gains personal knowledge of the message. A telephone call is considered to be unsuccessful if the call does not connect (e.g., no dial tone, a busy signal, or no answer after a predetermined number of rings). A telephone call is considered to be successful if answered by a voice mail system or answering machine or by a person other than the recipient at the intended telephone number (e.g., a coworker or family member). An e-mail message is considered to be successful if delivered to the recipient's e-mail account, regardless of whether the recipient actually views the e-mail message.

User: Any person who sends or receives a message or who enters data regarding a message, a recipient, or a sender. The term user includes but is not limited to senders and recipients.

Provisional application 60/189,089 filed Mar. 14 2000, which describes certain embodiments of the present invention, is herein incorporated by reference in its entirety as fully as though set forth here at length.

Referring to FIG. 1, a block diagram of a system in accordance with the present invention is illustrated. Server 100 includes processor 102 and memory 104 connected to processor 102. Server 100 can be a microcomputer (including a personal computer, workstation, or server), minicomputer, mainframe computer, or other computing device, but is preferably a multiprocessor server. Processor 102 can be one or more Intel Pentium® family or equivalent processors, but is preferably at least two 800 megahertz Intel Pentium III microprocessors. Although a single, or lesser, processor can be utilized, doing so would slow system performance or decrease the number of messages that could be simultaneously handled. Memory 104 can be permanent storage, such as a hard drive, temporary memory, such as random access memory, or a combination of permanent storage and temporary memory. Memory 104 is typically at least 128 megabytes of random access memory and at least one hard drive, although multiple redundant hard drives are desirable in order to decrease the likelihood of data loss from a hardware failure.

Message software 106 is stored in memory 104. Message software 106 can be written in C++ utilizing object oriented methodologies and can utilize one or more application programming interfaces (hereinafter "API's") to communicate with one or more of the interfaces described below. Those skilled in the art will appreciate, however, that many alternative programming languages (such as Assembly, C, Java, or Pascal) can be substituted for C++ and alternative methodologies can be utilized (such as structured programming) depending in part on the choice of programming language (or vice versa). Database 108 is optionally used in conjunction with message software 106. Database 108 can be Oracle version 8 or any suitable custom or commercial off-the-shelf relational, object oriented, or other database. Alternatively, data used by message software 106 can be stored in other memory structures, such as flat files, and data management functionality can be incorporated into message software 108. Message software 106 and database 108 are described in greater detail below in connection with FIG. 2 and tables 1 through 7.

In certain embodiments of the present invention, operator terminal 110 can optionally be utilized to provide a human operator access to certain message and related data. If operator terminal 110 is used, it is in communication with server 100 through a local or wide area network connection, such as an Ethernet connection, through a telephonic connection, or by other means (such as a non-telephonic Internet connection). Operator terminal 110, which can be a personal computer (or other microcomputer), dumb terminal, network computer, Internet appliance, mainframe computer, microcomputer, or other computing device, includes at least display 112, such as a cathode ray tube monitor or liquid crystal display, and input device 114, such as a keyboard. Alternatively, operator terminal can be dispensed with or combined with server 100 (so long as server 100 includes a display and an input device).

Processor 102 is also in communication with one or more interfaces 120. The one or more interfaces can include any or all of telephone interface 122, e-mail interface 124, facsimile interface 126, wireless interface 128, paging interface 130, and Web interface 132, as well as other interfaces. Telephone interface 122 can include a digital signal processing card, such as the Anteras card available from the Dialogic corporation and digital signal processing software, including speech recognition libraries, such as Speechworks from the Phillips corporation. E-mail interface 124 can be an ip connection, such as a T-1 or T-3 line. Facsimile interface 126 can include a fax board; however, if facsimile traffic is expected to be relatively light, a commercial off-the-shelf software program, such as Winfax Pro from the Symantec corporation can be utilized instead. Wireless interface 128 can include dedicated wireless reception facilities; in a first preferred embodiment, however, no separate wireless interface is utilized and wireless calls are received using telephone interface 122. Similarly, paging interface 130 can include dedicated page reception facilities, but in a first preferred embodiment, no such facilities are utilized and pages are received utilizing telephone interface 122. Web interface 132 can include an ip connection, such as a T-1 or T-3 line.

Figure 2:
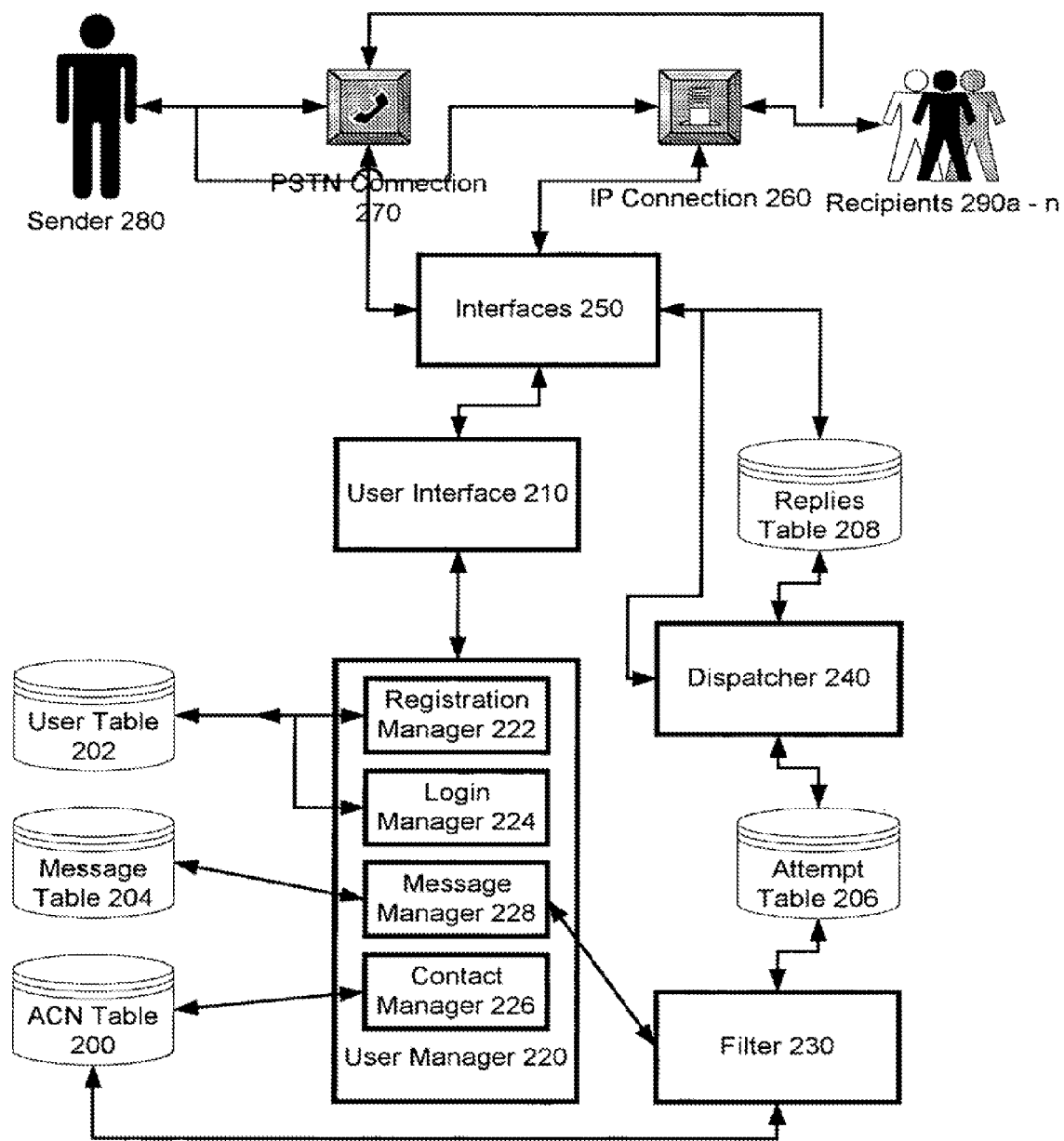
FIG. 2 is a block diagram illustrating the relationships between certain functional software components of a system in accordance with the present invention.

Referring to FIG. 2, the relationship between selected components of message software 106 and database 108 in an exemplary implementation are illustrated. Sender 280 accesses the system using an Internet protocol (hereinafter "ip") connection 260 or public switched telephone network (hereinafter "pstn") connection 270. Either or both of ip connection 260 and pstn connection 270 can be utilized in a system in accordance with the present invention. Moreover, although a connection is described as an ip or pstn connection (with respect to the character of the connection at the site of the system or a portion thereof), the sender of the message can himself utilize a different type of connection. For example, a sender might utilize an Internet telephone to place a call from his computer over an ip connection. This call might arrive at the system via a pstn connection. In addition, other connections or receptors might be present. For example, the system might include a wireless receiver.

Figure 5:
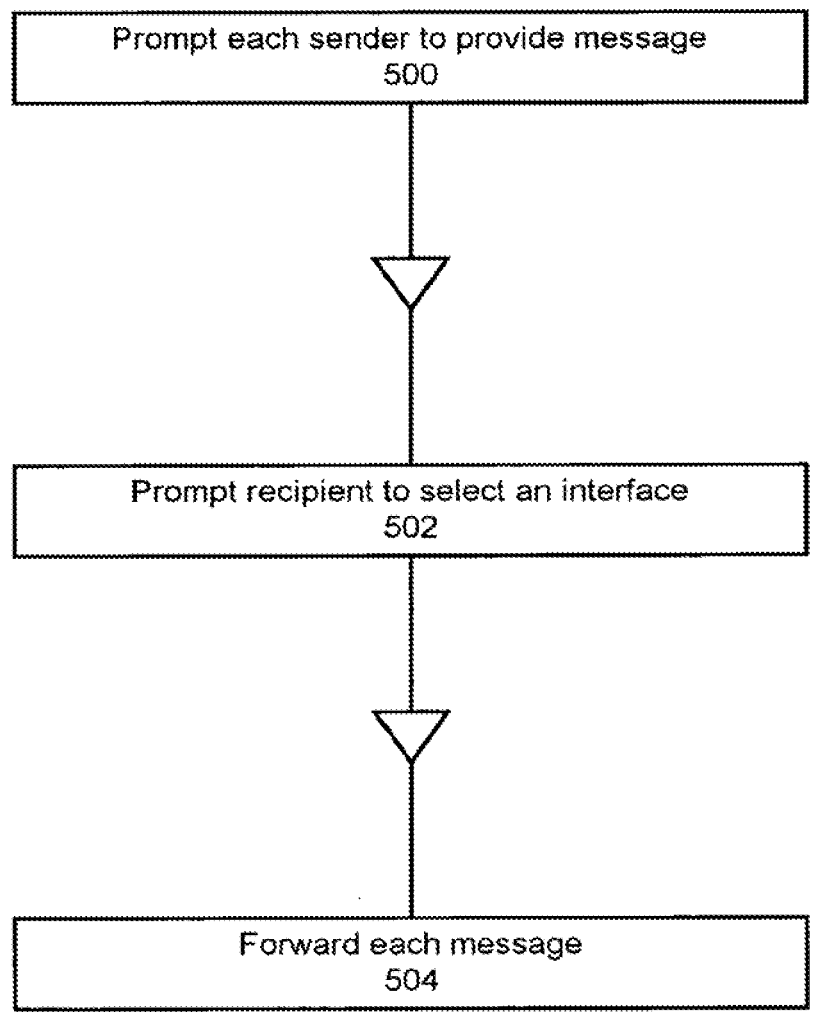
FIG. 5 is a flowchart illustrating a second method in accordance with the present invention.

User interface 210 can include a set of Web pages written in html and Javascript, perl, or other Web development language. Several Web pages utilized in an exemplary implementation of the present invention are illustrated in FIGS. 5A through 5_. Alternatively, other content viewable using a Web or other browser can be utilized or a Windows or other interface (such as a terminal emulator interface) can be utilized. User interface 210 includes interface elements such as text boxes, dropdown list boxes, command buttons, menus, and command line prompts (depending on the style of user interface implemented) to allow the sender to enter information about himself, about recipients, and about messages and to view the results of the attempted transmission of a message.

User manager 220 provides much of the functionality for initiating processing of information submitted by the sender and can include sub-modules such as registration manager 222, logon manager 224, contact manager 226, and message manager 228. Registration manager 222 receives data such as any or all of a sender's name, address, telephone number, facsimile number, e-mail address, log-in name, password, and payment information and stores such data in user tables 202, which are described below in tables 1 and 7. Of course user tables 202 can be combined into a single table, divided into more than two tables in certain embodiments hereunder and the information stored in user table 202 need not be stored in a separate table or tables (or any table at all) if a nonrelational database is utilized or no database at all is utilized. Similarly, the other tables described below can be divided or combined in different combinations and need not be utilized in all implementations of the present invention. Login manager 224 authenticates the sender upon login to the system by comparing login information submitted at that time with information previously stored in user tables 202.

Contact manager 226 receives data such as any or all of a recipient's name, home, business, and mobile telephone numbers, facsimile number, pager number, and e-mail address, as well as beginning and ending dates for the validity of such data, times of day (and days of the week) on which such data is to be used, and one or more orderings by which the various contact numbers are to be utilized, and stores such data in acn table 200, which is described below in table 2.

Message manager 228 receives message information, such as any or all of the text of a message, the subject of the message, information identifying its intended recipients, information relating to when the message is to be sent, and information relating to the format and method by which the replies are to be communicated to the sender and stores such information in message table 204, which is described below in table 3. In some embodiments hereunder a single message record can be generated for each message regardless of the number of recipients of the message; in other embodiments, however, a separate record can be generated for each recipient.

Filter 230 periodically checks message table 204 for messages needing processing and creates attempt records from the data stored in message table 204 and acn table 200 and stores the attempt records in attempt table 206, which is described below in table 4. Dispatcher 240 periodically checks attempts table 206 for messages to attempt to transmit to recipients. Each such message is dispatched to the appropriate interface of the one or more interfaces 250, which are software forming part of interfaces 120 in FIG. 1. Each of interfaces 250 formats any messages sent to it for transmission and initiates transmission of such messages. The dispatcher or the appropriate interface can monitor whether a message is successfully transmitted and can ensure that a predetermined number of attempts to send each message are made until the message is successfully sent or the attempt is regarded as a failure (and an appropriate entry can be made in the attempts table). An attempt can fail due to the lack of a dial tone, a busy signal, the failure of a recipient to answer a call, the unavailability of a server, or other reasons. If the attempt fails, the dispatcher can optionally extract another associated contact number from the acn table (or the filter or another module can do so or can utilize a different table for such purpose) and attempt to contact the recipient using the other associated contact number.

If a message is successfully transmitted, the dispatcher creates an expected reply entry inn replies tables 208, described below in tables 5 and 6. The dispatcher periodically monitors replies tables 208 to determine whether more than a predetermined amount of time has elapsed since the underlying message was transmitted. If so, dispatcher 240 can make an entry in messages table 204 and can optionally extract another associated contact number from the acn table (or the filter or another module can do so or can utilize a different table for such purpose) and attempt to contact the recipient using the other associated contact number.

If one of interfaces 250 receives a reply from a recipient, such reply is forwarded to dispatcher 240 or another module for forwarding to the sender or compilation into a composite report.

Figure 3:
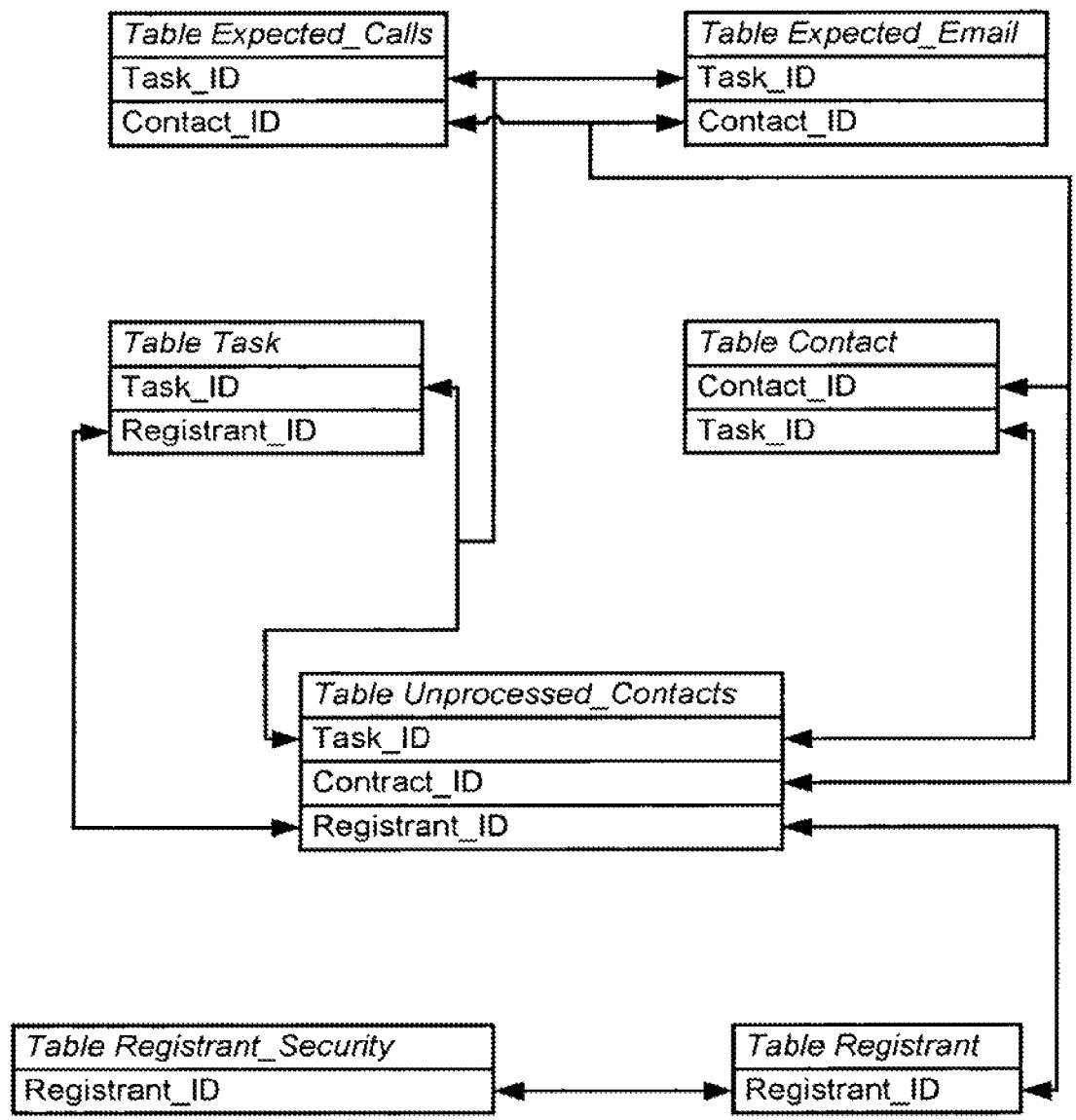
FIG. 3 illustrates the schema of a database usable in conjunction with the present invention.

Referring to FIG. 3 and tables 1 through 7, a portion of an exemplary database usable in conjunction with the present invention is illustrated. Those skilled in the art will appreciate that a production database would contain a greater number of tables and of fields and that the database might be fully normalized. Such details have been omitted in order to illustrate the inventive concepts of the present invention without obscuring such concepts with an excessive amount of detail.

Table Registrant, illustrated below in table 1, contains information regarding senders, including the name, address, telephone number, e-mail address, facsimile number, and payment status of each sender. It also contains references to pending message tasks relating to the sender. The latter category of information in particular might be stored in a separate table, depending on the particular implementation of the present invention. Table Registrant is related to Table Registrant_Security, described below in table 7, in a one-to-one relationship and to Tables Task and Unprocessed_Contact in one-to-many relationships, with each Registrant record potentially relating to many Task or Unprocessed_Contact records.

TABLE 1

Registrant

| FIELD NAME | TYPE | DESCRIPTION |
|---|---|---|
| Registrant_ID | integer | Identification number, primary key of table |
| First_Name | text | Sender's first name |
| Last_Name | text | Sender's last name |
| Middle_Initial | text | Sender's middle initial |
| Title | text | Sender's title |
| Address1 | text | Sender's address (line 1) |
| Address2 | text | Sender's address (line 2) |
| City | text | Sender's city |
| State | text | Sender's state |
| Zip | text | Sender's ZIP code or other postal code |
| Email | text | Sender's e-mail address; secondary key field |
| Country | text | Sender's country |
| Phone_Country | text | Sender's telephone country code |
| Phone | text | Sender's telephone number |
| Phone_Ext | text | Sender's telephone extension number |
| Fax_Country | text | Sender's facsimile country code |
| Fax | text | Sender's facsimile number |
| Fax_Ext | text | Sender's facsimile extension |
| Pager | text | Sender's pager number |
| Login_Name | text | Sender's username |
| Passwrd | text | Sender's password |
| Short_Name | text | Sender's name |
| Short_Name_Title | text | Sender's title |
| Registration_Date | date/time | Date sender registered |
| Revision_Date | date/time | Date sender revised registrant data |
| Payment_Status | text | Sender's payment status (e.g., no bills outstanding, bills outstanding, past due bills outstanding, etc.) |
| Email_Status | text | Sender's e-mail status (e.g., valid, invalid, etc.) |
| Number_Of_Tasks | integer | Number of outstanding message tasks to be completed for sender |
| Last_Task1_ID | integer | Message task identification number |
| Last_Task1_Date | date/time | Date message task created |
| Last_Task2_ID | integer | Message task identification number |
| Last_Task2_Date | date/time | Date message task created |
| Last_Task3_ID | integer | Message task identification number |
| Last_Task3_Date | date/time | Date message task created |
| Last_Task4_ID | integer | Message task identification number |
| Last_Task4_Date | date/time | Date message task created |
| Last_Task5_ID | integer | Message task identification number |
| Last_Task5_Date | date/time | Date message task created |
| Last_Task6_ID | integer | Message task identification number |
| Last_Task6_Date | date/time | Date message task created |
| Last_Task7_ID | integer | Message task identification number |
| Last_Task7_Date | date/time | Date message task created |
| Last_Task8_ID | integer | Message task identification number |
| Last_Task8_Date | date/time | Date message task created |
| Last_Task9_ID | integer | Message task identification number |
| Last_Task9_Date | date/time | Date message task created |
| Last_Task10_ID | integer | Message task identification number |
| Last_Task10_Date | date/time | Date message task created |

Table Task, illustrated below in table 2, contains information regarding each task, including references to the sender to whom it relates and the contact record to be used in sending it. It also contains the subject and text of the message. Table Task is related to Table Unprocessed_Contact, described below in table 4, in one-to-many relationships, with each Task record potentially relating to many Unprocessed_Contact records.

TABLE 2

Task

| FIELD NAME | TYPE | DESCRIPTION |
| --- | --- | --- |
| Task_ID | integer | Identification number, primary key of table |
| Registrant_ID | integer | Identification number; primary key of table Registrant |
| Registrant_Short_Name | text | Registrant's name |
| Subject | text | Subject of message |
| First_Contact_ID | integer | Identification number, primary key of table contact |
| Message | text | Text of message |
| Creation_Date | date/time | Date message task created; secondary key field |
| Authorize_Recipient_To_Relay | integer | Recipient's authorization to relay messages |
| Total_Contacts | integer | Total number of recipients of message task |
| Processed_Contacts | integer | Number of recipients with respect to whom processing is complete |
| Completion_Date | date/time | Date by which message task is to be completed |

Table Contact, illustrated below in table 3, contains information regarding recipients, including the name, telephone number, and e-mail address of each recipient, as well as status information regarding contact attempts. Table Contact is related to Tables Expected_Calls, described below in table 6, and Expected_Email, described below in table 5, in many-to-one relationships with each contact record potentially relating to many Expected_Calls or Expected_Email records.

Table Unprocessed_Contacts, illustrated below in table 4, contains references to tables Task, Contact, and Registrant, as well as information relating to the communications channel to be used in a particular contact, the time when the task was created, and the time when the task is to be abandoned, if not earlier completed.

TABLE 3

Contact

| FIELD NAME | TYPE | DESCRIPTION |
| --- | --- | --- |
| Contact_ID | integer | Identification number; primary key of table |
| Task_ID | integer | Identification number; primary key of table Task; secondary key of table Contact |
| Mode | integer | Preferred communications mode of this contact record |
| Email | text | Recipient's e-mail address |
| Country | text | Recipient's telephone country code |
| Phone | text | Recipient's telephone number |
| Ext | text | Recipient's telephone extension |
| Contact_When | integer | Time of day when recipient should be contacted using contact data in this record |
| Creation_Time | date/time | Time when contact record created; secondary key of table |
| Contact_End | date/time | Date when contact will cease being valid |
| Contact_End_Time | date/time | Time when contact will cease being valid |
| Seq_Number | integer | Number of contact record within set of contact records relating to the present recipient |
| Alternate | integer | Number of contact record to be utilized if another contact record is required |
| Name | text | Name of recipient |
| Last_Contact | date/time | Last time recipient was contacted using data in this contact record |
| Status | integer | Status of message (e.g., not yet sent, waiting for reply, reply received, etc.) |
| Response | integer | Whether a response has been received from the recipient |
| Minutes | integer | Minutes recipient took to reply |
| Alternate_Delay | integer | Length of time before another contact record will be utilized |

TABLE 4

Unprocessed_Contacts

| FIELD NAME | TYPE | DESCRIPTION |
|---|---|---|
| Task_ID | integer | Identification number; primary key of table Task; part of primary key of table Unprocessed_Contacts |
| Contact_ID | integer | Identification number; primary key of table Contact; part of primary key of table Unprocessed_Contacts |
| Registrant_ID | integer | Identification number; primary key of table Registrant |
| Mode | integer | Communications mode by which recipient is to be contacted (e.g., e-mail, telephone, etc.) |
| TimeStamp | date/time | Time at which this contact was created; part of primary key of table Unprocessed_Contacts |
| Contact_End | date/time | Time at which to cease attempting to deliver message to this recipient |

Table Expected_Email, illustrated below in table 5, contains information regarding e-mail messages expected to be received in response to messages, including the e-mail address of the recipient and references to the Task and Contact tables.

TABLE 5

Expected_Email

| FIELD NAME | TYPE | DESCRIPTION |
|---|---|---|
| Task_ID | integer | Identification number; primary key of table Task |
| Contact_ID | integer | Identification number; primary key of table Contact |
| Email | text | E-mail address of recipient; primary key of table |

Table Expected_Calls, illustrated below in table 6, contains information regarding telephone messages expected to be received in response to messages, including the telephone number of the recipient and references to the Task and Contact tables.

TABLE 6

Expected_Calls

| FIELD NAME | TYPE | DESCRIPTION |
|---|---|---|
| Task_ID | integer | Identification number; primary key of table Task |
| Contact_ID | integer | Identification number; primary key of table Contact |
| Phone_no | text | Telephone number of recipient; primary key of table |

Table Registrant_Security, illustrated below in table 7, contains information regarding senders that must remain secure, including their usernames, passwords, and credit card numbers. Optionally, this table can be protected by more thorough security measures than the other tables in the database.

TABLE 7

Registrant_Security

| FIELD NAME | TYPE | DESCRIPTION |
|---|---|---|
| Login_Name | text | Username of sender |
| Login_Passwd | text | Password of sender |

TABLE 7-continued

Registrant_Security

| FIELD NAME | TYPE | DESCRIPTION |
|---|---|---|
| Login_Name_And_Passwd | text | Combined username and password of sender; primary key of table |
| Credit_Card_Type | text | Type of sender's credit card (e.g., VISA, American Express, etc.) |
| Credit_Card_Number | text | Sender's credit card number |
| Credit_Card_Expiration_Date | text | Expiration date of sender's credit card |

Figure 4:
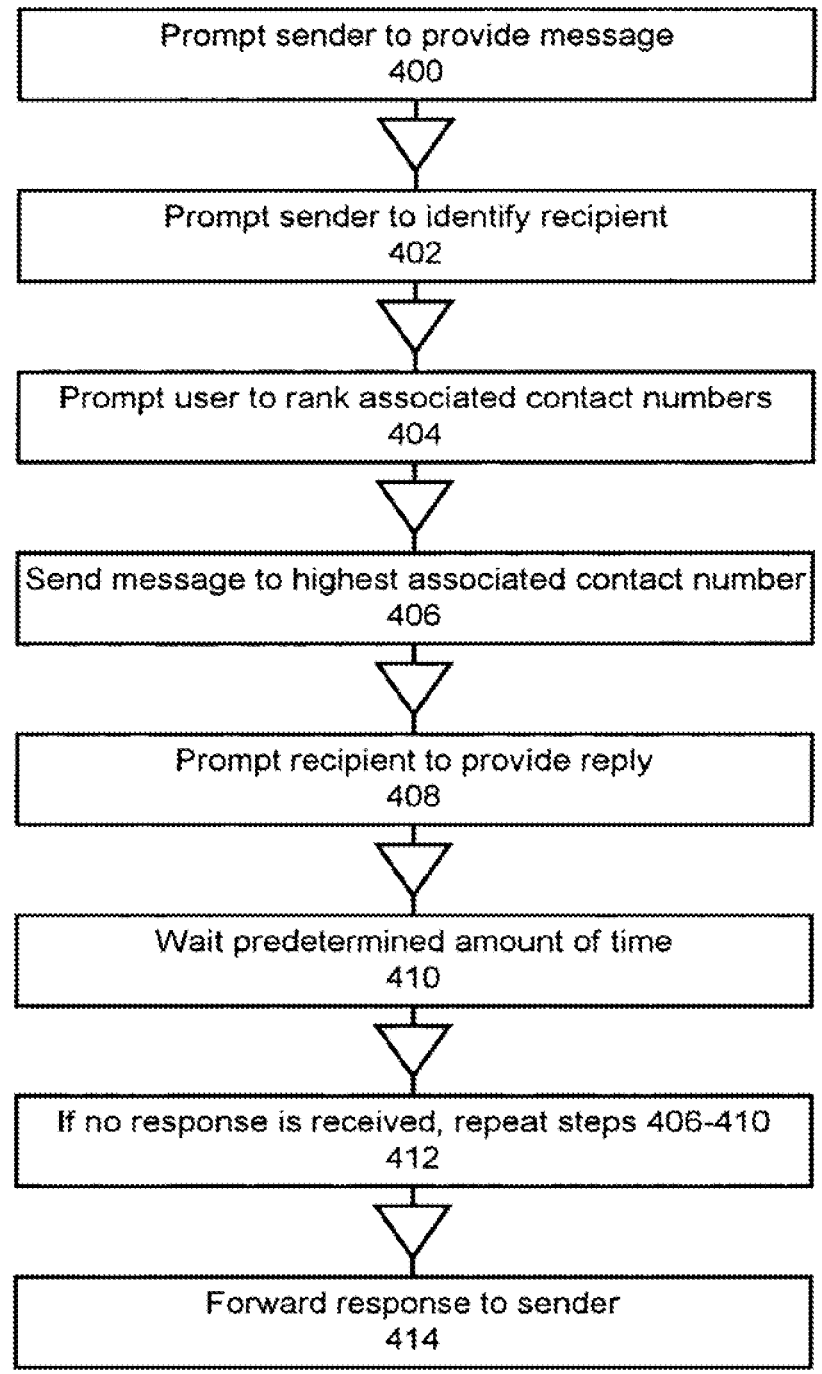
FIG. 4 is a flowchart illustrating a first method in accordance with the present invention.
Figure 6A:
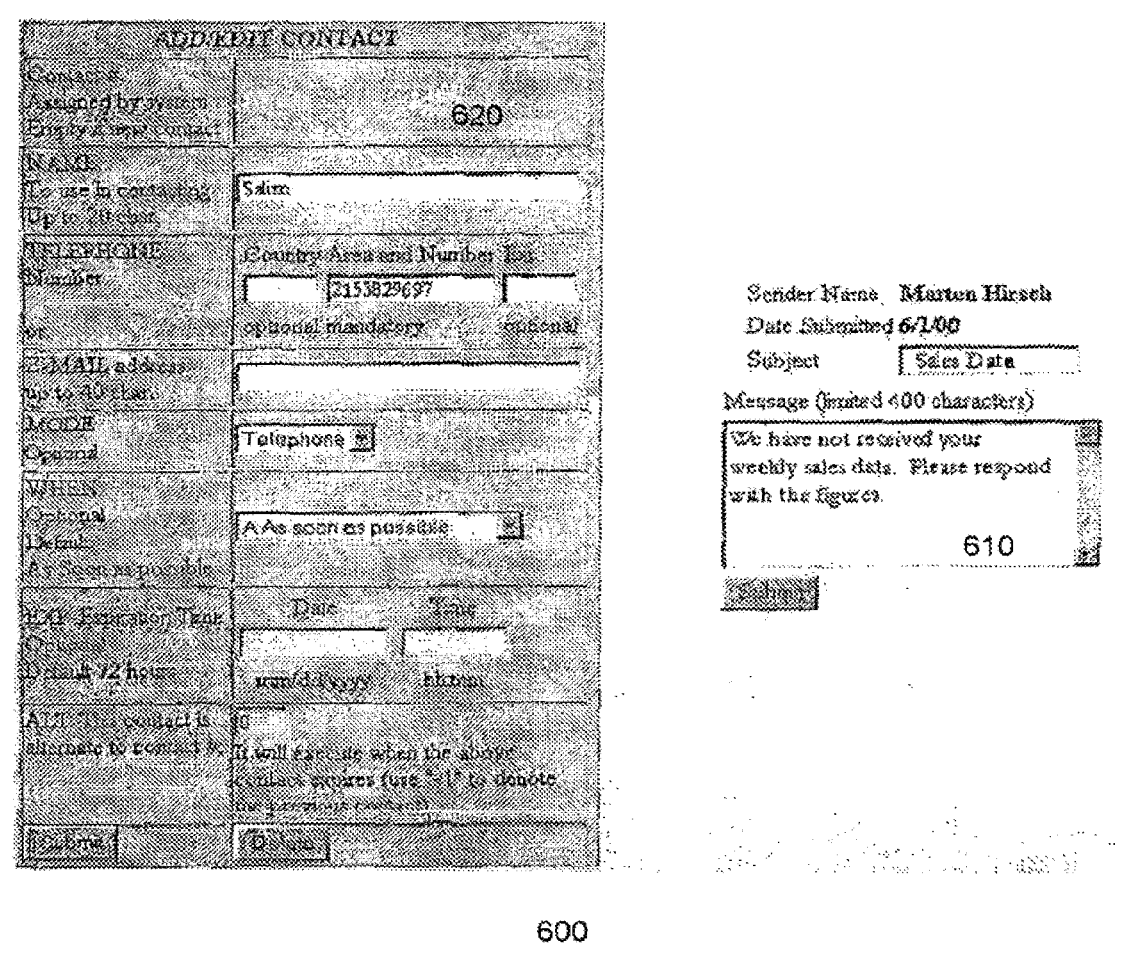

Referring to FIGS. 4, 6A, and 6B, a method in accordance with a preferred embodiment of the present invention is illustrated. In step 400, a sender is prompted to provide a message. The sender can be prompted using whichever one of interfaces 120 the sender is using to contact message software 106. For example, the sender can access message software 106 by calling a predetermined telephone number using a mobile telephone or a traditional landline telephone. In such a case, the sender will be prompted to provide a message by the playing of a recorded message giving the sender the option to provide a message and instructions for doing so (typically pressing or saying one or more numbers, uttering the message, and pressing or saying one or more numbers). The sender can first be prompted to identify himself by entering or saying one or more numbers or words, such as a username or account number and a password or PIN. If the sender accesses message software 106 over the Web, the sender typically navigates to a predetermined Web site, where the sender is so prompted by the display of a message or one or more interface elements, such as text entry or memo boxes, menu choices, or a command line, such as memo control 610 illustrated in FIG. 6A. In addition to prompting the sender to provide the text of a message, the sender can be prompted to provide a message subject, a type of data to be collected from the recipient (such as yes or no answers, dates, dollar amounts, integers, or other forms of data), a message to be left if the message is sent by telephone and the telephone call is answered by a voicemail system, and a series of custom prompts to be provided to the recipient (such as "press or say 'one' for yes, 'two' for no, 'three' for no opinion, . . . ").

In step 402, which can occur before, at the same time as, or after step 400, the sender is prompted to identify one or more recipients of the message. If the sender is accessing message software 106 over the Web, the user can be prompted to enter, for each contact, a name, one or more of a telephone number, e-mail address, or other contact number or address, the order in which contact numbers should be utilized if more than one is given, optionally a starting date and time when this contact number will be valid, optionally an expiration date and time when this contact number will no longer be valid, and optionally a delay period to elapse prior to the forwarding of the message to the recipient. In a first embodiment, all such information is entered by the sender; in other embodiments, however, other users can enter a portion or all of such information. For example, each recipient can be prompted to enter his or her data, which can be stored in an address book subsequently made available to the sender. Similarly, in an intra-company or intra-organizational embodiment, a system administrator or a manager can be prompted to enter all such data, or merely a ranking of contact numbers entered by the recipients.

The user is prompted to enter such information by the display of a message or one or more interface elements, such as text entry or memo boxes, menu choices, or a command line, such as contact entry controls 620 illustrated in FIG. 6A. If the sender is accessing message software 106 using a telephone interface, the sender can be prompted to enter similar information orally or using a telephone keypad. In any case, if the user has previously entered any contacts (or if contacts have been imported), the user can be prompted by providing the user with a searchable address book.

In step 404, the sender is prompted to rank the associated contact numbers in the order in which the sender desires the associated contact numbers to be used in sending the message to the recipient or recipients. Typically, the sender will rank the associated contact numbers only once for each recipient and will reuse such rankings from message to message, although the ranking can depend on a condition such as the day of the week and the time of the day. For example, a sender might choose to rank a particular recipient's associated contact numbers in the following order (from highest to lowest) (1) business telephone number, (2) mobile telephone number, (3) business e-mail address, (4) business facsimile number, (5) home telephone number, and (6) home e-mail address for contacts initiated during business hours and (1) home telephone number, (2) mobile telephone number, (3) home e-mail address, (4) business facsimile number, (5) business e-mail address, and (6) business telephone number for contacts initiated other than during business hours. The sender can be prompted to rank the associated contact numbers by presenting a list of such associated contact numbers to the sender together with a series of text entry controls into which rankings can be entered if the sender is accessing message software 106 over the Web or by a recorded message reading such a list to the sender and offering the sender the opportunity to rank each associated contact number using a telephone keypad if the sender is accessing message software 106 using a telephone.

In step 406, the message is sent to the highest ranked associated contact number. The appropriate interface of interfaces 120 formats the message for transmission depending on the type of the associated contact number. For example, if the associated contact number is a telephone number, a recorded message will be played to the recipient. The main body of this message will be the message recorded by the sender using a telephone, the message entered by the sender using e-mail after conversion to voice format using text to voice software, or the message as formatted following entry by other means. Also included in the transmitted message can be any or all of a subject line, a set of reply options (such as "yes", "no", "do not call here again", and "send reply message"), and an explanation of the messaging system. If the message is transmitted to a telephone number that includes an extension, the extension will be automatically dialed. Optionally, if a message is not successfully transmitted, message software 106 retransmits the message (but no more than a predetermined number of times or for no longer than a predetermined period of time). The message may not be successfully transmitted if no dial tone is available, a busy signal is received, a telephone call is not answered, an Internet resource is unavailable, etc.

In step 408, the recipient is prompted to provide a reply by the display or playing of a visual or audible set of reply options, such as "yes", "no", "do not call here again", and "send reply message". In step 410, message software 106 waits a predetermined amount of time, which can be as little as zero seconds, but typically is an amount of time deemed reasonable for the preparation of a reply to the message by the recipient. In step 412, following the conclusion of the waiting period, steps 406 through 410 are repeated if no response has been received by message software 106 using the next lower ranked associated contact number until a reply is received or each associated contact number has been used without receiving a reply. In step 414, the reply is forwarded to the sender. Typically, the reply is forwarded using a communication channel previously selected by the sender. Moreover, the reply can be forwarded when received or as part of a composite report forwarded periodically or after receipt of a predetermined number or percentage of replies from all recipients. A composite report can include a listing of all replies and failures to reply, composite statistics regarding such data, or both. An exemplary composite report is illustrated in FIG. 6B. The method then terminates.

Figure 6C:
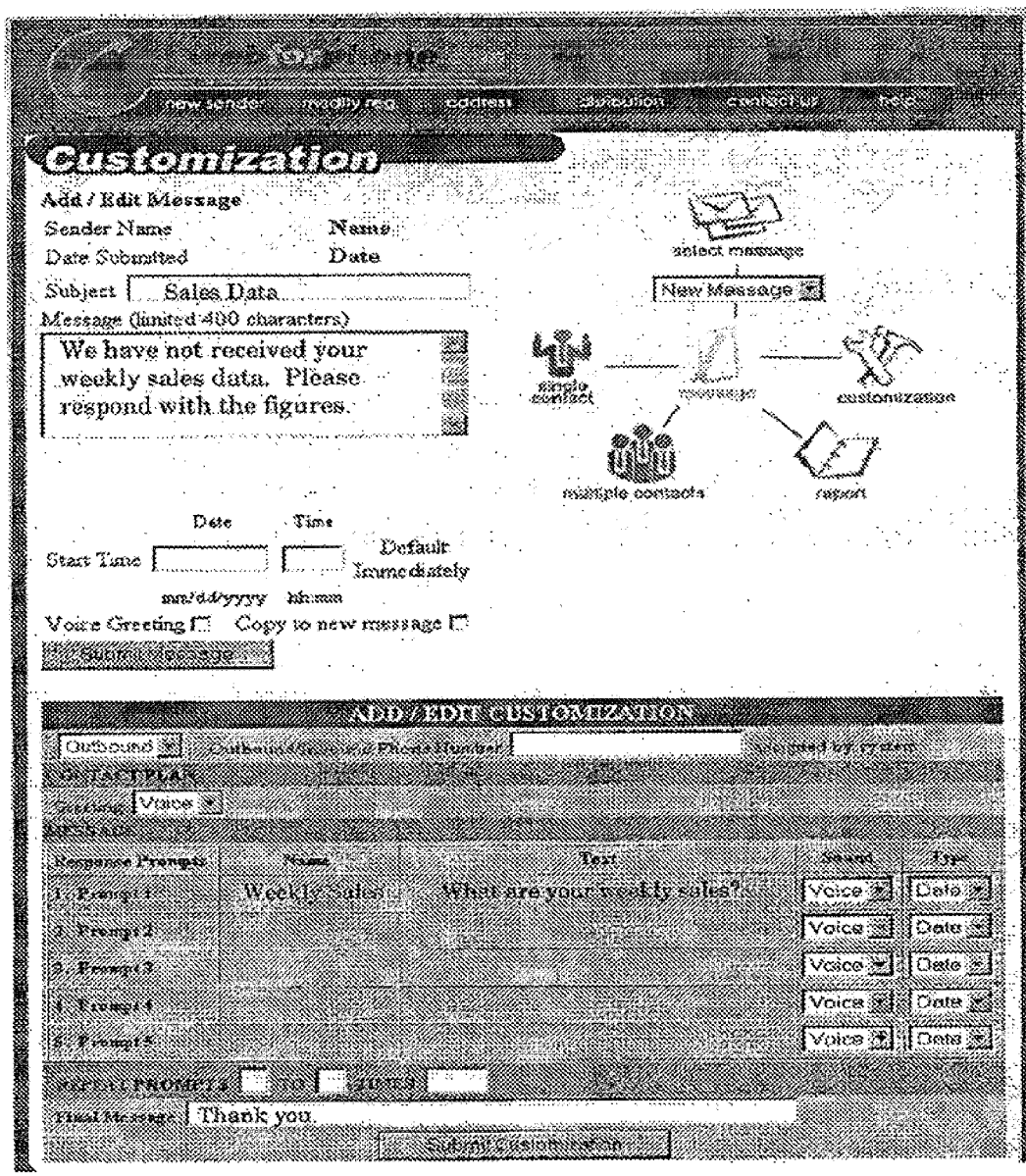
FIG. 6C illustrates a user interface screen of a Web site usable in conjunction with the present invention.

FIG. 6C illustrates an interface screen allowing the user to set an array of options described in more detail above. The user is also able to send a message from this screen. However, in other embodiments of the present invention, the customization options can be included in an interface screen from which no messages can be sent.

Referring to FIG. 5, a second method in accordance with the present invention is illustrated. In step 500, a sender of an inbound message is prompted to send a message. The sender is presented with one or more sets of prompts, typically including questions. For example, if the sender is a consumer of a product and the recipient is the product's manufacturer or a related party, the prompts may include questions relating to the identity of the product, demographic data relating to the consumer, and the consumer's level of satisfaction with the product. If the sender is a consultant providing hours worked and the recipient is responsible for entering such information into a billing system, the questions might relate to the amount of work performed, a description of the type of work performed, the identity of the client for whom the work was performed, and the date and location at which the work was performed.

In step 502, the recipient is prompted to select an interface by which forwarded messages are to be received by the recipient. This interface need not utilize the same medium of communications as that utilized by the sender. For example, a recipient could provide multiple associated contact numbers, including a telephone number and an e-mail address. The recipient could nevertheless choose in step 502 to receive all messages by e-mail. Any message received from a sender calling the telephone number would be converted to text and sent as e-mail to the recipient, either as an individual message or as part of a composite report, depending on the implementation of the present method and, optionally, the recipient's preferences.

In step 504, each message is forwarded to the recipient using the selected interface. In some implementations, each message is forwarded individually as it is received. In other implementations, messages are forwarded periodically to the recipient as part of a composite report. This composite report can include each message in its entirety, summary data relating to the messages, or both the individual messages and the summary data. In yet other implementations, the recipient can select whether to receive the message individually or as part of periodic composite reports, or both.

Figure 7:
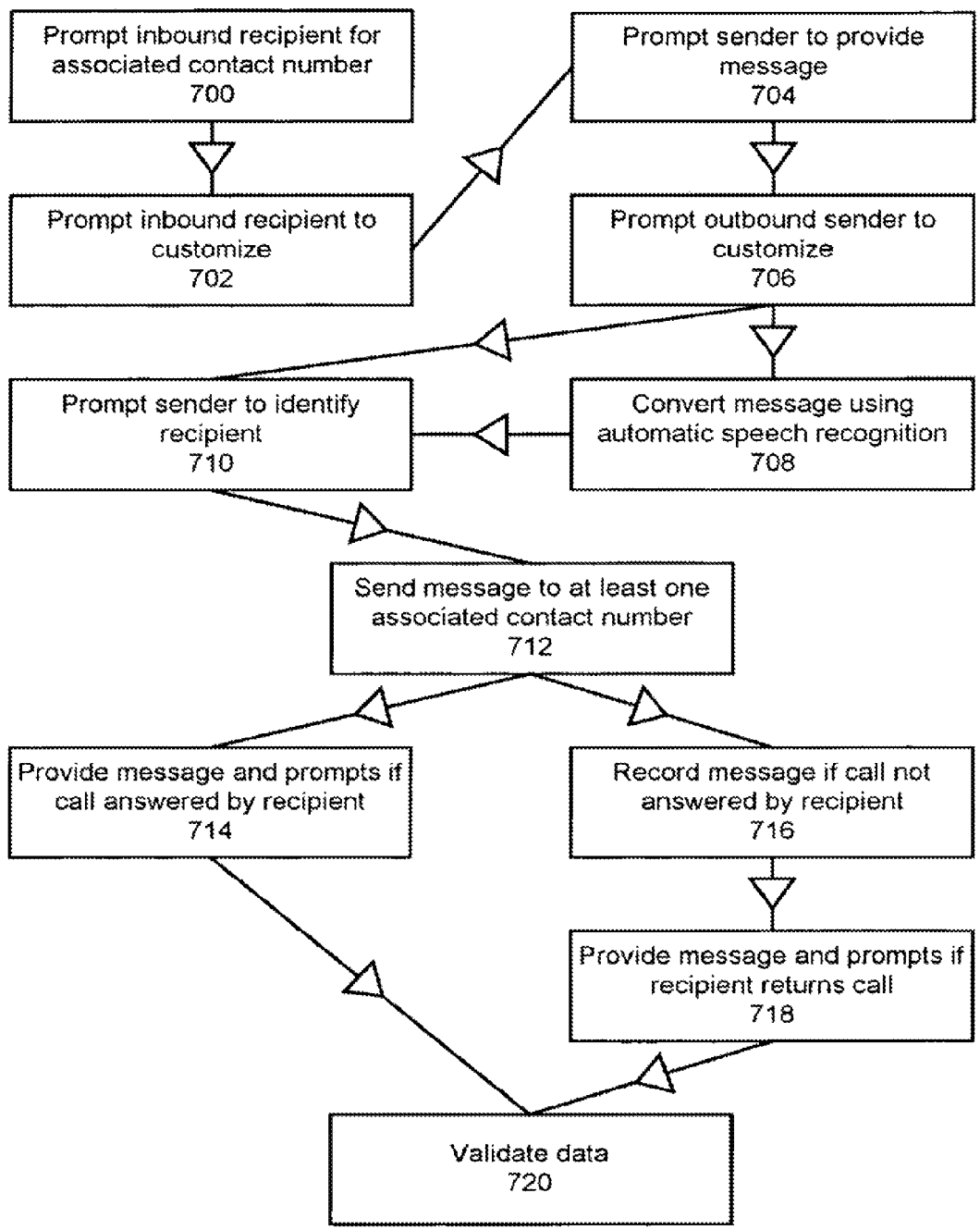
FIG. 7 is a flowchart illustrating a third method in accordance with the present invention.

Referring to FIG. 7, a third method in accordance with the present invention is illustrated. In step 700, an inbound recipient is optionally prompted to provide at least one associated contact number if the message being sent is an inbound message. Inbound messages can be used to provide customer feedback regarding products, to collect specific information on a regular basis, such as numbers of hours worked by professionals and sales figures of salesmen among other uses. Accordingly, in some implementations, only a single associated contact number is necessary. Additional associated contact numbers can be used to provide a choice in the medium of communication to be used (such as e-mail or telephone) or to provide redundant alternative contact numbers to alleviate anticipated load problems. At least one associated contact number is then provided to anticipated senders of inbound messages. Step 700 (if it is performed) can be performed as an initial step or at any other time prior to the performance of step 712.

In step 702, an inbound recipient is optionally prompted to customize at least one of the number of prompts to be provided to a sender, the text of each prompt, the type of data expected to be received in response to each prompt, the number of sets of such prompts, and optionally other properties. Step 700 (if it is performed) can be performed at any time prior to the performance of step 712.

In step 704, the sender is prompted to provide a message. If the sender is the sender of an outbound message, the sender can be prompted in a manner similar to that described in connection with step 400 of the method illustrated in FIG. 4. If the sender is the sender of an inbound message, the sender is presented with one or more sets of prompts, typically including questions. For example, if the sender is a consumer of a product and the recipient is the product's manufacturer or a related party, the prompts may include questions relating to the identity of the product, demographic data relating to the consumer, and the consumer's level of satisfaction with the product. If the sender is a consultant providing hours worked and the recipient is responsible for entering such information into a billing system, the questions might relate to the amount of work performed, a description of the type of work performed, the identity of the client for whom the work was performed, and the date and location at which the work was performed.

In step 706, an outbound sender is optionally prompted to customize if the message is an outbound message. The outbound sender can be prompted to customize one or more of when the message will be sent, the number of prompts to be provided to a sender, the text of each prompt, the type of data expected to be received in response to each prompt, the number of sets of such prompts, and optionally other properties. Step 706 (if it is performed) can be performed at any time prior to the performance of step 712.

In step 708, a message received from the sender in voice form can optionally be converted to text form using automatic speech recognition. Prompts and other data received from the sender in voice form can also optionally be converted to text form using automatic speech recognition. If messages, prompts, and other data are to be used in the form received, conversion is not necessary. For example, a message received in voice form can be replayed without conversion if the message is to be delivered by telephone or can be stored in a .wav or other file as part of an e-mail message, allowing the recipient to replay the message using a computer. Of course, messages can be required to be provided in text form in some embodiments, eliminating the need to convert from voice to test, or can be required to be provided in the form to be used, eliminating the need for any conversion. If messages or prompts need to be converted from text to voice such conversion may be performed as a part of step 708 or at another time. Those skilled in the art will appreciate that conversion of text to voice is less complicated than conversion of voice to text and can be performed with greater accuracy. Step 708 (if it is performed) can be performed at any time subsequent to the receipt of the data to be converted and prior to the performance of step 712.

In step 710, the sender is prompted to select a recipient. If the message is an inbound message, the sender is so prompted by providing to the sender at least one associated contact number at which the sender can provide a message to the recipient. If the message is an outbound message, the sender is so prompted in a manner similar to that in which the sender is so prompted in step 402 of the method illustrated in FIG. 4.

In step 712, the message is sent to at least one associated contact number. If the message is an outbound message, the message can optionally be sent repeatedly to different associated contact numbers until a reply is received as described in connection with FIG. 4 above. If the message is an inbound message, the message is typically sent to only one associated contact number, unless transmission of the message is unsuccessful, in which case the message can be retransmitted to the same or a different associated contact number in different implementations of the present method.

In step 714, if the message is an outbound message sent by means of a telephone call and the recipient answers the call, the recipient is provided with the message and a series of prompts (such as "press or say 'one' for yes, press or say 'two' for no, . . . "). In step 716, if the message is an outbound message sent by means of a telephone call and a voicemail system answers the call, a message is automatically recorded on the voicemail system including a telephone number for the recipient to call. For example, when the telephone call is answered (by a human or a machine), the answering party can be prompted with an appropriate prompt (e.g., "push or say 'one' to continue") and the absence of a response to such a prompt can be interpreted as indicating the presence of a voicemail system, in which case a message can be recorded after the detection of an appropriate voicemail tone or beep. Optionally, a party other than the recipient answering a telephone call can be offered the choice of receiving a telephone number for the recipient to call by means of an appropriate answer to an appropriate prompt (e.g, "push or say 'one' to continue or push or say 'two' to receive a telephone number to call back at a later time"). In step 718, if the recipient places a call to the telephone number provided in step 716, the recipient is provided with the message and the series of prompts that would have been provided to the recipient in step 714 had the recipient then answered the telephone call.

In step 720, data received from an outbound recipient in response to prompts provided to the recipient are optionally validated. Step 720 can be performed at the time that each datum is received or subsequently. The validation can be based on a data type provided by the sender in response to step 706. For example, if the data type is date, and a date data type consists of eight digits in a particular implementation, with the first two digits indicating the month, the next two indicating the day, and the last four indicating the year, a response might be checked to ensure that (1) it contained eight digits, (2) that the first two digits together formed a number between one and twelve, (3) that the next two digits formed a number between one and thirty-one (or optionally between one and twenty-eight to thirty-one depending on the month), and (4) that the last four digits formed a number between a reasonable beginning year (such as 1880) and a reasonable ending year (such as 2100). If invalid data are received, the recipient may be prompted to re-enter the data (if validation is performed during the telephone call) or the invalid data may be noted in a report supplied to the sender. After validation (if any) is performed, any data received is forwarded to the sender. The method then terminates.

While this invention has been described with an emphasis upon preferred embodiments, it will be obvious to those of ordinary skill in the art that variations in the preferred devices and methods can be used and that it is intended that the invention can be practiced otherwise than as specifically That which is claimed is:

1. A system for performing requests to perform tasks from users comprising:
   an IP Network;
   a public switched telephone network (PSTN);
   at least one server in the IP network, the at least one server being capable of executing tasks assigned by users, communicating via an IP network communication channel with users on the IP network and communicating via a PSTN communication channel with users on the PSTN network, and receiving and sending communications to and from the PSTN users via the PSTN communication channel through a two-way translator that translates speech communications to a form that the at least one server uses to process the tasks and that translates communications from the task to speech communications that are communicated as speech or voice communications to the PSTN users via the PSTN;
   wherein the at least one server is capable of receiving requests that originate as speech from the PSTN users and are transmitted as speech via the PSTN communication channel of the PSTN, the translator translates the speech requests into text, and the server executes the requests; and
   wherein the at least one server receives requests that originate as text from the IP Network users via the IP network communication channel of the IP Network and executes the requests made by the IP Network users, the text requests not being converted into speech.

2. The system for performing requests according to claim 1 wherein the at least one server queries and updates at least one database in response to a request from users.

3. The system for performing requests according to claim 1 wherein the at least one server receives voice messages from users on the PSTN, the translator translates the voice messages to text messages, and the text message is communicated to users on the IP network.

4. The system for performing requests according to claim 3 wherein the at least one server receives text messages from users on the IP network, the translator translates the text messages to voice messages, and the voice messages are communicated to users on the PSTN.

5. The system for performing requests according to claim 4 wherein the at least one server stores the voice messages and/or text messages.

6. The system for performing requests according to claim 5 wherein the voice messages may be communicated to users on the PSTN that are different from the users who created the request.

7. The system for performing requests according to claim 1 wherein the PSTN is a mobile telephone network or a voice IP network.

8. The system for performing requests according to claim 1 further comprising at least one ISP that connects the at least one server and the IP network users to the IP network.

9. The system for performing requests according to claim 1 further comprising a graphical user interface that provides IP and PSTN users assistance in capturing registration services, log-in services, task assignment services, and message related services.

10. The system for performing requests according to claim 1 wherein the server is capable of obtaining data from other servers in the IP network.

11. The system for performing requests according to claim 10 further comprising a gateway between the IP network and the PSTN.

12. The system for performing requests according to claim 1 wherein the at least one server queries at least one remote database to use in contacting users and reporting until task objectives are satisfied or the contacts are exhausted.

13. The system for performing requests according to claim 1 wherein the requests from users are communicated via fixed and mobile telephones, personal digital assistants, paging services, fax services, or remote databases, and the requests from IP network users are transmitted from digital text terminals.

14. The system for performing requests according to claim 1 wherein the at least one server transmits an output of a requested task to at least one human recipient and wherein the recipient responds to the task.

15. The system for performing requests according to claim 1 wherein the at least one user's response is processed by the at least one server and a notification is transmitted to the requesting user.

16. The system for performing requests according to claim 1 wherein the request includes contact information for network communications, databases, and recipients.

17. The system for performing requests according to claim 16 wherein the contact information is used to determine the requested task and wherein the contact information is obtained from at least one of the IP network servers, a database, or a recipient.

18. The system for performing requests according to claim 1 wherein the requested task can be changed during the execution of the task.

19. The system for performing requests according to claim 1 wherein at least one request is in the form of a text communication and the translator includes automatically recognizing and translating the text communication to a speech communication.

20. The system for performing requests according to claim 1, wherein the server is capable of receiving calls from multiple simultaneous users on the PSTN.

21. The system for performing requests according to claim 1, wherein the server is capable of receiving calls from multiple simultaneous users on the IP Network.

22. The system for performing requests according to claim 1 wherein the server receives voice messages from users on the PSTN and stores the messages.

23. The system for performing requests according to claim 1, wherein the request includes identifying a recipient of the output of the requested task and a respective medium used by the recipient, the server translates text output into speech if the recipient uses speech for communication, and an output of the task is transmitted to the recipient.

24. The system for performing requests according to claim 1, wherein the users are human users or devices.

25. A method for performing requests to perform tasks from users comprising:
   providing an IP Network;
   providing a public switched telephone network (PSTN);
   providing at least one server in the IP network, the at least one server being capable of executing tasks assigned by users, communicating via an IP network communication channel with users on the IP network and communicating via a PSTN communication channel with users on the PSTN network, and receiving and sending communications to and from the PSTN users via the PSTN communication channel through a two-way translator that translates speech communications to a form that the at least one server can uses to process the tasks and that translates communications from the task to speech communications that are communicated as speech or voice communications to the PSTN users via the PSTN;

wherein the at least one server receives requests that originate as speech from the PSTN users and are transmitted as speech via the PSTN communication channel of the PSTN, the translator translates the speech requests into text, and the server executes the requests; and wherein the at least one server receives requests that originate as text from the IP Network users via the IP network communication channel and executes the text requests made by the IP Network users, the text requests not being converted into speech.

26. A system for extending service of servers in a network that uses a first communication medium via a first communication channel, to users using a different communication channel and medium, the network services extend jointly also to users using a second communication medium via a second communication channel, comprising;

a server in the network, the server is capable of two way translation between the first communication medium of the network and the second communication medium, the server is also capable of receiving and sending communications in the second communication medium via the second communication channel;

the server receives a request to perform a task from at least one user via one of the communication channels, wherein the request originates as and is transmitted to the server as a communication in either in the first or second medium; and the server translates the request if received in the second communication medium into the first medium, executes the task as requested, the output of the performed task is communicated as requested to users in the network, or is translated to the second communication medium and transmitted in the second communication medium to users of the second medium via the second communication channel, wherein the server does not translate the request if received in the first communication medium.

27. The system according to claim 26, wherein the first communication channel is that of IP Network and the second communication channel is a public switching telephone network, a mobile telephone network, or voice.

28. The system for performing requests according to claim 26, wherein the users are human users or devices.

* * * * *